(12) United States Patent
Pan et al.

(10) Patent No.: US 10,740,218 B2
(45) Date of Patent: Aug. 11, 2020

(54) METHOD AND DEVICE FOR DETERMINING USAGE LOG

(71) Applicant: BEIJING KINGSOFT INTERNET SECURITY SOFTWARE CO., LTD., Beijing (CN)

(72) Inventors: Quanhai Pan, Beijing (CN); Liqing Chen, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 55 days.

(21) Appl. No.: 15/977,175

(22) Filed: May 11, 2018

(65) Prior Publication Data

US 2018/0260303 A1 Sep. 13, 2018

Related U.S. Application Data

(63) Continuation of application No. PCT/CN2016/099360, filed on Sep. 19, 2016.

(30) Foreign Application Priority Data

Nov. 12, 2015 (CN) .......................... 2015 1 0778038

(51) Int. Cl.
*G06F 11/00* (2006.01)
*G06F 11/36* (2006.01)
(Continued)

(52) U.S. Cl.
CPC ...... *G06F 11/3636* (2013.01); *G06F 11/0709* (2013.01); *G06F 11/302* (2013.01);
(Continued)

(58) Field of Classification Search
CPC ............... G06F 11/3636; G06F 11/302; G06F 11/3476; G06F 11/0781; G06F 11/3065;
(Continued)

(56) References Cited

U.S. PATENT DOCUMENTS

2013/0171960 A1* 7/2013 Kandregula ........ G06F 11/3013
455/405
2014/0258506 A1* 9/2014 Stickle .................... H04L 67/22
709/224
(Continued)

FOREIGN PATENT DOCUMENTS

CN  101610461 A  12/2009
CN  103378991 A1  10/2013
(Continued)

OTHER PUBLICATIONS

International Search Report and Written Opinion issued in corresponding International Application No. PCT/CN2016/099360 dated Dec. 21, 2016, and English translation thereof (20 pages).
(Continued)

*Primary Examiner* — Joseph D Manoskey
(74) *Attorney, Agent, or Firm* — Osha Liang LLP

(57) ABSTRACT

A method and a device for determining a usage log are provided. The method includes: filtering evaluation information with respect to a target software submitted by an application recommendation software of each of at least one mobile terminal, to obtain target evaluation information; receiving usage logs with respect to the target software sent by at least one mobile terminal; and determining a usage log matching with the target evaluation information according to a preset matching rule.

15 Claims, 3 Drawing Sheets

(51) Int. Cl.
  *G06F 11/07* (2006.01)
  *G06F 11/34* (2006.01)
  *G06F 11/30* (2006.01)
  *H04L 29/08* (2006.01)

(52) U.S. Cl.
  CPC ...... *G06F 11/3438* (2013.01); *G06F 11/3476* (2013.01); *H04L 67/22* (2013.01)

(58) Field of Classification Search
  CPC ............. G06F 11/3072; G06F 11/3075; G06F 11/0709; G06F 11/3438
  See application file for complete search history.

(56) References Cited

U.S. PATENT DOCUMENTS

2015/0312422 A1* 10/2015 Leemet ................ H04L 41/082
                                                        455/406
2017/0353565 A1* 12/2017 Kumar .................... H04L 67/22
2019/0065496 A1*  2/2019 Verkasalo ............. H04L 67/025

FOREIGN PATENT DOCUMENTS

| CN | 103399861 A | 11/2013 |
| CN | 104765793 A | 7/2015 |
| CN | 105049269 A | 11/2015 |
| CN | 105243009 A | 1/2016 |

OTHER PUBLICATIONS

Office Action issued in corresponding Chinese Application No. 201510778038.6 dated Jul. 26, 2017, and English translation thereof (12 pages).

\* cited by examiner

METHOD AND DEVICE FOR DETERMINING USAGE LOG

CROSS-REFERENCE TO RELATED APPLICATIONS

This application is a continuation application of International Application No. PCT/CN2016/099360, filed Sep. 19, 2016, which is based on and claims priority and benefits to Chinese Patent Application Serial No. 201510778038.6, filed with the State Intellectual Property Office of P. R. China on Nov. 12, 2015, the entire content of both applications are incorporated herein by reference.

FIELD

The present disclosure relates to a computer technology field, and more particularly to a method and a device for determining a usage log.

BACKGROUND

With development of mobile terminal technology, more and more software is applied in the mobile terminal.

In general, a user may evaluate the software and feedback various problems encountered in a process of using the software through an information feedback platform provided by an application recommendation software.

However, it is difficult for a programmer to locate a problem according to description of the problem fed back by the user and the programmer has to communicate with the user for many times to locate the problem because of various types of software and too many problems fed back by the user. Thus, speed for solving the problem is slow, and the efficiency is low.

SUMMARY

Embodiments of the present disclosure provide a method for determining a usage log, including: filtering evaluation information with respect to a target software submitted by an application recommendation software of each of at least one mobile terminal, to obtain target evaluation information; receiving usage logs with respect to the target software sent by at least one mobile terminal; and determining a usage log matching with the target evaluation information according to a preset matching rule.

Embodiments of the present disclosure provide a device for determining a usage log, including an obtaining module, a receiving module, and a first determining module. The obtaining module is configured to filter evaluation information with respect to a target software submitted by an application recommendation software of each of at least one mobile terminal, to obtain target evaluation information. The receiving module is configured to receive usage logs with respect to the target software sent by at least one mobile terminal. The first determining module is configured to determine a usage log matching with the target evaluation information according to a preset matching rule.

Embodiments of the present disclosure further provide a server, including a device for determining a usage log according to any one of above-mentioned embodiments.

Embodiments of the present disclosure further provide a server, including a processor and a memory configured to store instructions executable by the processor. The processor is configured to: filter evaluation information with respect to a target software submitted by an application recommendation software of each of at least one mobile terminal, to obtain target evaluation information; receive usage logs with respect to the target software sent by at least one mobile terminal; and determine a usage log matching with the target evaluation information according to a preset matching rule.

Embodiments of the present disclosure further provide a non-transitory computer-readable storage medium having stored therein instructions that, when executed by a processor of a server, cause the server to perform a method for determining a usage log according to any one of above-mentioned embodiments.

Embodiments of the present disclosure further provide a computer program, which when running on a processor, performs a method for determining a usage log according to any one of above-mentioned embodiments.

BRIEF DESCRIPTION OF THE DRAWINGS

In order to explicitly illustrate technical solutions in embodiments of the present disclosure, a brief introduction for the accompanying drawings used when describing the embodiments will be listed as follows. Apparently, the drawings described below are only corresponding to some embodiments of the present disclosure, and those skilled in the art may obtain other drawings according to these drawings without creative labor.

DETAILED DESCRIPTION

In order to explicitly illustrate technical solutions in embodiments of the present disclosure, the technical solutions in the embodiments of the present disclosure will be described clearly and completely in connection with the drawings in the embodiments of the present disclosure as follows. Apparently, the described embodiments are only part of embodiments of the present disclosure, instead of the entire embodiments. Based on embodiments described herein, those skilled in the art may obtain all other embodiments without creative labor, which belongs to the protection scope of the present disclosure.

In order to solve the problem in the related art, embodiments of the present disclosure provide a method and a device for determining a usage log. Firstly, the method for determining a usage log provided in embodiments of the present disclosure will be introduced in the following.

Figure 1:
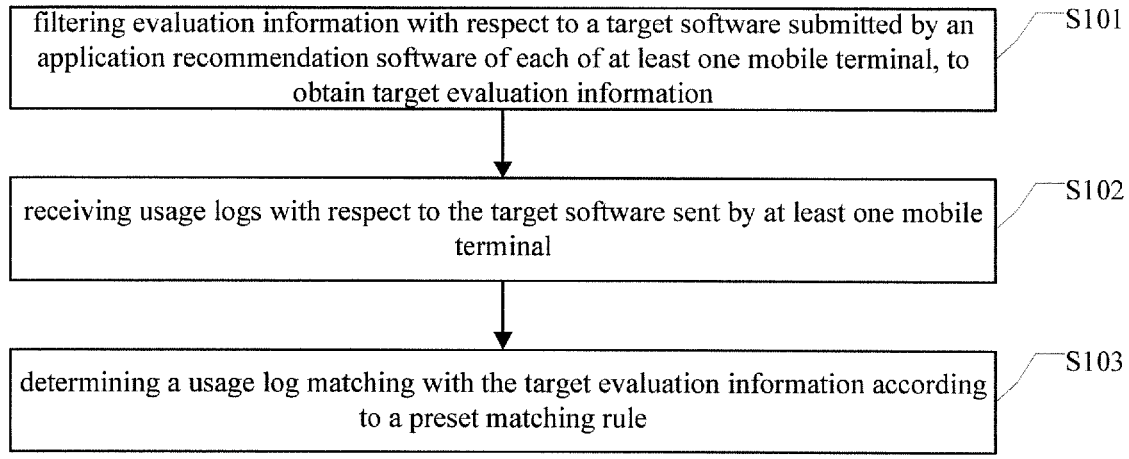
FIG. 1 is a first flow chart of a method for determining a usage log according to an embodiment of the present disclosure.

FIG. 1 is a first flow chart of a method for determining a usage log according to an embodiment of the present disclosure, in which the method includes follows.

At block S101, evaluation information with respect to a target software submitted by an application recommendation software of each of at least one mobile terminal is filtered, to obtain target evaluation information.

In actual application, the target evaluation information may include level evaluation information with a level lower than a preset level with respect to the target software and may include effective evaluation content.

In actual application, the level evaluation information may be start-level evaluation. For example, the evaluation level is divided into five star-levels, i.e., one-star level, two-star level, three-star level, four-star level, and five-star level respectively. The level evaluation information may also be score evaluation. For example, when the evaluation score is between 1 and 20, it is at a first level; when the evaluation score is between 21 and 40, it is at a second level; when the evaluation score is between 41 and 60, it is at a third level; when the evaluation score is between 61 and 80, it is at a fourth level; and when the evaluation score is between 81 and 100, it is at a fifth level. Specific forms of the level evaluation information are not limited in embodiments of the present disclosure.

In actual application, the evaluation information including effective evaluation content may be information that includes content in evaluation, or information that includes a specific character in evaluation content. The specific character is also generally called as a key word. The specific character is not limited in embodiments of the present disclosure, which can be set according to actual demand.

At block S102, usage logs with respect to the target software sent by at least one mobile terminal are received.

At block S103, a usage log matching with the target evaluation information is determined according to a preset matching rule.

It should be noted that, the mobile terminal in embodiments of the present disclosure may be installed with an iOS operating system (which is an operating system of a handheld device developed by Apple inc.), an Android operating system (which is an operating system based on free and open Linux source codes), or a windows phone operating system (which is an operating system of a mobile phone published by Microsoft inc.). Also, the embodiments are certainly applicable to other mobile terminals, which is not limited herein.

In actual application, the above mentioned target software may be WeChat, QQ, Phone Helper, Jinshan phone DuBa of mobile phone version, and the like. The target software is not specifically limited in embodiments of the present disclosure.

In actual application, the above mentioned application recommendation software may be Jinshan application market of mobile phone version, Google application store of mobile phone version, and the like. The application recommendation software is not specifically limited in embodiments of the present disclosure.

For example, taking the start-level evaluation as an example, the preset level is assumed to be the three-star level.

Assuming that communication connection is established between a server and three mobile phones with the Android operating system, in which the three mobile phones include mobile phone A, mobile phone B, and mobile phone C, the server receives a problem with respect to the Jinshan phone DuBa of mobile phone version occurring in a process of using the Jinshan phone DuBa of mobile phone version submitted by a first user through the Jinshan application market of mobile phone version in the mobile phone A, a problem with respect to the Jinshan phone DuBa of mobile phone version occurring in a process of using the Jinshan phone DuBa of mobile phone version submitted by a second user through the Jinshan application market of mobile phone version in the mobile phone B, and a problem with respect to the Jinshan phone DuBa of mobile phone version occurring in a process of using the Jinshan phone DuBa of mobile phone version submitted by a third user through the Jinshan application market of mobile phone version in the mobile phone C. An evaluation level of the Jinshan phone DuBa of mobile phone version evaluated by the first user is five-star, an evaluation level of the Jinshan phone DuBa of mobile phone version evaluated by the second user is five-star, and evaluation level of the Jinshan phone DuBa of mobile phone version evaluated by the third user is two-star.

The evaluation information with respect to the Jinshan phone DuBa of mobile phone version submitted by the above-mentioned three terminals is filtered, and the evaluation information of the third user with respect to the Jinshan phone DuBa of mobile phone version is determined as the target evaluation information.

A usage log with respect to the Jinshan phone DuBa of mobile phone version sent from the mobile phone A, a usage log with respect to the Jinshan phone DuBa of mobile phone version sent from the mobile phone B, and a usage log with respect to the Jinshan phone DuBa of mobile phone version sent from the mobile phone C are received. A usage log matching with the evaluation information of the third user with respect to the Jinshan phone DuBa of mobile phone version is determined according to a preset matching rule.

In detail, in actual application, the usage log matching with the target evaluation information may be determined according to the preset matching rule as follows. Receiving time of the target evaluation information and receiving time of each usage log are obtained. When an absolute value of a difference between the receiving time of the target evaluation information and receiving time of a usage log is less than or equal to a first preset threshold, it is determined that the usage log matches with the target evaluation information.

For example, the server obtains that the problem with respect to the Jinshan phone DuBa of mobile phone version occurring in the process of using the Jinshan phone DuBa of mobile phone version is submitted by the first user through the Jinshan application market of mobile phone version in the mobile phone A at 17:55 on Jun. 15, 2015, the problem with respect to the Jinshan phone DuBa of mobile phone version occurring in the process of using the Jinshan phone DuBa of mobile phone version is submitted by the second user through the Jinshan application market of mobile phone version in the mobile phone B at 18:34 on Jun. 15, 2015, and the problem with respect to the Jinshan phone DuBa of mobile phone version occurring in the process of using the Jinshan phone DuBa of mobile phone version is submitted by the third user through the Jinshan application market of mobile phone version in the mobile phone C at 19:34 on Jun. 15, 2015.

The usage log with respect to the Jinshan phone DuBa of mobile phone version is sent by the mobile phone A at 17:58 on Jun. 15, 2015, the usage log with respect to the Jinshan phone DuBa of mobile phone version is sent by the mobile phone B at 18:40 on Jun. 15, 2015, and the usage log with respect to the Jinshan phone DuBa of mobile phone version is sent by the mobile phone C at 19:40 on Jun. 15, 2015.

The difference between the time for receiving the usage log with respect to the Jinshan phone DuBa of mobile phone version sent by the mobile phone C and the time for receiving the problem with respect to the Jinshan phone DuBa of mobile phone version occurring in the process of using the Jinshan phone DuBa of mobile phone version submitted by the first user through the mobile phone A is obtained as 105 minutes. The difference between the time for receiving the usage log with respect to the Jinshan phone DuBa of mobile phone version sent by the mobile phone C and the time for receiving the problem with respect to the Jinshan phone DuBa of mobile phone version occurring in the process of using the Jinshan phone DuBa of mobile phone version submitted by the second user through the mobile phone B is obtained as 66 minutes. The difference between the time for receiving the usage log with respect to the Jinshan phone DuBa of mobile phone version sent by the mobile phone C and the time for receiving the problem with respect to the Jinshan phone DuBa of mobile phone version occurring in the process of using the Jinshan phone DuBa of mobile phone version submitted by the third user through the mobile phone C is obtained as 6 minutes.

Assuming that the first preset threshold is 30 minutes, the usage log with respect to the Jinshan phone DuBa of mobile phone version sent by the mobile phone C is determined as the usage log of the above-mentioned target evaluation information.

In detail, in actual application, the usage log matching with the target evaluation information may be determined according to the preset matching rule as follows. Receiving time of the target evaluation information, receiving time of each usage log, first parameter information of a mobile terminal sending the target evaluation information, and second parameter information of each mobile terminal sending each usage log are obtained, in which each of the first parameter information and the second parameter information includes a national language, a mobile phone type, and/or a software version number. When an absolute value of a difference between the receiving time of the target evaluation information and receiving time of a usage log is less than or equal to a second preset threshold, and when the first parameter information of the mobile terminal sending the target evaluation information is same as second parameter information of the mobile terminal sending the usage log, it is determined that the usage log matches with the target evaluation information.

For example, assuming that the receiving time of the target evaluation information is 20:18 on Jun. 15, 2015, the national language of the mobile terminal sending the target evaluation information is Chinese (simplified), the type of the mobile terminal sending the target evaluation information is Xiaomi 4, and the software version number of the Jinshan phone DuBa of mobile phone version is 2.7.2.1026.

The time of receiving the usage log with respect to the Jinshan phone DuBa of mobile phone version sent by the mobile phone A is 18:57 on Jun. 15, 2015, the time of receiving the usage log with respect to the Jinshan phone DuBa of mobile phone version set sent by the mobile phone B is 19:40 on Jun. 15, 2015, and the time of the receiving the usage log with respect to the Jinshan phone DuBa of mobile phone version sent by the mobile phone C is 20:20 on Jun. 15, 2015.

The difference between the time of receiving the usage log with respect to the Jinshan phone DuBa of mobile phone version sent by the mobile phone A and the time of receiving the problem with respect to the Jinshan phone DuBa of mobile phone version occurring in the process of using the Jinshan phone DuBa of mobile phone version submitted by the first user through the Jinshan Application market of mobile phone version in mobile phone A is 62 minutes. The difference between the time of receiving the usage log with respect to the Jinshan phone DuBa of mobile phone version sent by the mobile phone A and the time of receiving the problem with respect to the Jinshan phone DuBa of mobile phone version occurring in the process of using the Jinshan phone DuBa of mobile phone version submitted by the second user through the Jinshan Application market of mobile phone version in mobile phone B is 23 minutes. The difference between the time of receiving the usage log with respect to the Jinshan phone DuBa of mobile phone version sent by the mobile phone A and the time of receiving the problem with respect to the Jinshan phone DuBa of mobile phone version occurring in the process of using the Jinshan phone DuBa of mobile phone version submitted by the third user through the Jinshan Application market of mobile phone version in mobile phone C is 81 minutes.

The difference between the time of receiving the usage log with respect to the Jinshan phone DuBa of mobile phone version sent by the mobile phone B and the time of receiving the problem with respect to the Jinshan phone DuBa of mobile phone version occurring in the process of using the Jinshan phone DuBa of mobile phone version submitted by the first user through the Jinshan Application market of mobile phone version in mobile phone A is 105 minutes. The difference between the time of receiving the usage log with respect to the Jinshan phone DuBa of mobile phone version sent by the mobile phone B and the time of receiving the problem with respect to the Jinshan phone DuBa of mobile phone version occurring in the process of using the Jinshan phone DuBa of mobile phone version submitted by the second user through the Jinshan Application market of mobile phone version in mobile phone B is 66 minutes. The difference between the time of receiving the usage log with respect to the Jinshan phone DuBa of mobile phone version sent by the mobile phone B and the time of receiving the problem with respect to the Jinshan phone DuBa of mobile phone version occurring in the process of using the Jinshan phone DuBa of mobile phone version submitted by the third user through the Jinshan Application market of mobile phone version in mobile phone C is 38 minutes.

The difference between the time of receiving the usage log with respect to the Jinshan phone DuBa of mobile phone version sent by the mobile phone C and the time of receiving the problem with respect to the Jinshan phone DuBa of mobile phone version occurring in the process of using the Jinshan phone DuBa of mobile phone version submitted by the first user through the Jinshan Application market of mobile phone version in mobile phone A is 125 minutes. The difference between the time of receiving the usage log with respect to the Jinshan phone DuBa of mobile phone version sent by the mobile phone C and the time of receiving the problem with respect to the Jinshan phone DuBa of mobile phone version occurring in the process of using the Jinshan phone DuBa of mobile phone version submitted by the second user through the Jinshan Application market of mobile phone version in mobile phone B is 106 minutes. The difference between the time of receiving the usage log with respect to the Jinshan phone DuBa of mobile phone version sent by the mobile phone C and the time of receiving the problem with respect to the Jinshan phone DuBa of mobile phone version occurring in the process of using the Jinshan phone DuBa of mobile phone version submitted by the third user through the Jinshan Application market of mobile phone version in mobile phone C is 2 minutes.

It is assumed that the preset second threshold is 60 minutes, national languages of the mobile phone A, the mobile phone B, and the mobile phone C are all Chinese (simplified), types of the mobile phone A, the mobile phone B, and the mobile phone C are all Xiaomi 4, the software version number of the Jinshan phone DuBa of mobile phone version in the mobile A is 2.7.2.1026, the software version number of the Jinshan phone DuBa of mobile phone version in the mobile B is 2.7.1.1023, and the software version number of the Jinshan phone DuBa of mobile phone version in the mobile C is 2.7.2.1026.

The difference between the receiving time, 20:18 on Jun. 15, 2015, of the target evaluation information and the time, 20:20 on Jun. 15, 2015, of receiving the usage log sent by the mobile phone C is 2 minutes, which is less than 60 minutes, and the national language, phone type, and the version of the Jinshan phone DuBa of mobile phone version of the mobile terminal sending the evaluation information is same as those of mobile phone C respectively, then the usage log with respect to the Jinshan phone DuBa of mobile phone version sent by the mobile phone C is determined as the usage log of the above-mentioned target evaluation information.

After a correspondence relationship between the evaluation information and the usage log is determined, the programmer can locate the problem fed back by the user according to the matched usage log without communication with the user It should be noted that, the above illustration in which the three mobile phones A, B, and C installed with Android operating system, the Jinshan application market of mobile phone version, and the Jinshan phone DuBa of mobile phone version are taken as examples is just a specific embodiment of the present disclosure, but does not constitute limitation to the present disclosure.

With the embodiment of the present disclosure illustrated in FIG. 1, the programmer can locate the problem fed back by the user according to the determined usage log without communication with the user, thus improving speed and efficiency for solving the problem.

Figure 2:
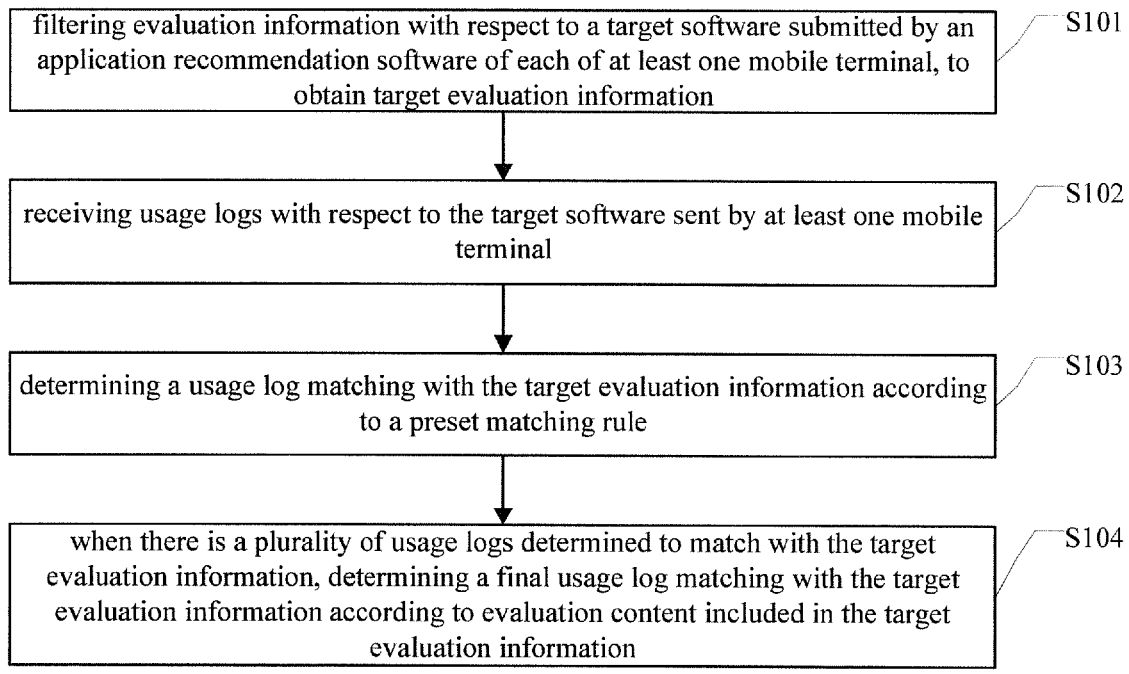
FIG. 2 is a second flow chart of a method for determining a usage log according to an embodiment of the present disclosure.

FIG. 2 is a second flow chart of a method for determining a usage log according to an embodiment of the present disclosure. The embodiment of the present disclosure illustrated in FIG. 2 further includes block S104 based on the embodiment illustrated in FIG. 1.

At block 104, when there is a plurality of usage logs determined to match with the target evaluation information, a final usage log matching with the target evaluation information is determined according to evaluation content included in the target evaluation information.

In actual application, there is a case in which there is a plurality of usage logs determined to match with the target evaluation information, and at this case, the final usage log matching with the target evaluation information may be determined according to the evaluation content included in the target evaluation information.

In detail, the final usage log matching with the target evaluation information may be determined according to the specific character (such as a name or a version of software) included in the evaluation content. The specific character is also generally called as a key word. The specific character is not limited in embodiments of the present disclosure, which can be set according to actual demand, narrowing a range of the usage logs matching with the target evaluation information.

With the embodiment of the present disclosure illustrated in FIG. 2, the range of the usage logs matching with the target evaluation information is narrowed, and thus the usage log matching with the target evaluation information is more accurate, further improving the speed for solving the problem.

Corresponding to above-mentioned method embodiments, embodiments of the present disclosure also provide a device for determining a usage log.

Figure 3:
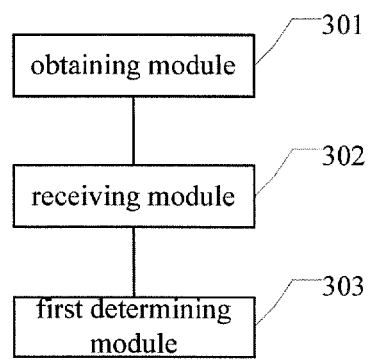
FIG. 3 is a first block diagram illustrating a device for determining a usage log according to an embodiment of the present disclosure.

FIG. 3 is a first block diagram illustrating a device for determining a usage log according to an embodiment of the present disclosure, in which the device includes an obtaining module 301, a receiving module 302, and a first determining module 303.

The obtaining module 301 is configured to filter evaluation information with respect to a target software submitted by an application recommendation software of each of at least one mobile terminal, to obtain target evaluation information.

In actual application, the target evaluation information may include a level lower than a preset level with respect to the target software and/or effective evaluation content.

The receiving module 302 is configured to receive usage logs with respect to the target software sent by at least one mobile terminal.

The first determining module 303 is configured to determine a usage log matching with the target evaluation information according to a preset matching rule.

In actual application, the first determining module 303 illustrated in embodiments of the present disclosure is configured to: obtain receiving time of the target evaluation information and receiving time of each usage log; and when an absolute value of a difference between the receiving time of the target evaluation information and receiving time of a usage log is less than or equal to a first preset threshold, determine that the usage log matches with the target evaluation information.

In actual application, the first determining module 303 illustrated in embodiments of the present disclosure is configured to: obtain receiving time of the target evaluation information, receiving time of each usage log, first parameter information of a mobile terminal sending the target evaluation information, and second parameter information of each mobile terminal sending each usage log, in which each of the first parameter information and the second parameter information includes a national language, a mobile phone type, and/or a software version number; and when an absolute value of a difference between the receiving time of the target evaluation information and receiving time of a usage log is less than or equal to a second preset threshold, and when the first parameter information of the mobile terminal sending the target evaluation information is same as second parameter information of the mobile terminal sending the usage log, determine that the usage log matches with the target evaluation information.

With the embodiment of the present disclosure illustrated in FIG. 3, the programmer can locate the problem fed back by the user according to the determined usage log without communication with the user, thus improving speed and efficiency for solving the problem.

Figure 4:
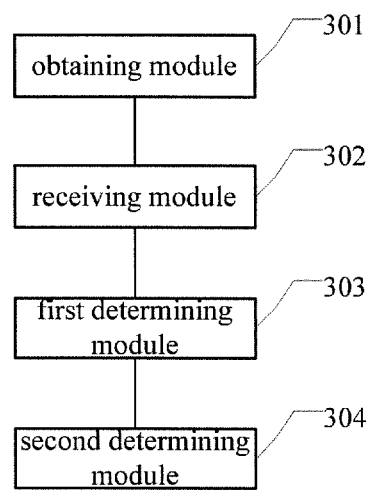
FIG. 4 is a second block diagram illustrating a device for determining a usage log according to an embodiment of the present disclosure.

FIG. 4 is a second block diagram illustrating a device for determining a usage log according to an embodiment of the present disclosure. The embodiment of the present disclosure illustrated in FIG. 4 further includes a second determining module 304 based on the embodiment illustrated in FIG. 3.

The second determining module 304 is configured to determine a final usage log matching with the target evaluation information according to evaluation content included in the target evaluation information, when there is a plurality of usage logs determined to match with the target evaluation information.

With the embodiment of the present disclosure illustrated in FIG. 4, the range of the usage logs matching with the target evaluation information is narrowed, and thus the usage log matching with the target evaluation information is more accurate, further improving the speed for solving the problem.

Figure 5:
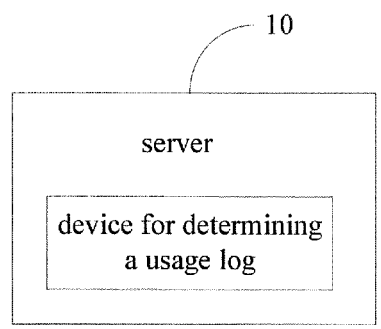
FIG. 5 is a block diagram illustrating a server according to an embodiment of the present disclosure.

FIG. 5 is a block diagram illustrating a server according to an embodiment of the present disclosure. Referring to FIG. 5, in embodiments of the present disclosure, the server 10 includes the above-mentioned device for determining a usage log.

It should be noted that, the server 10 includes any one of the above-mentioned devices for determining a usage log. The server filters evaluation information with respect to a target software submitted by an application recommendation software of each at least one mobile terminal so as to obtain target evaluation information, receives usage logs with respect to the target software sent by at least one mobile terminal, and determines a usage log matching with the target evaluation information according to a preset matching rule.

With the embodiment of the present disclosure, the programmer can locate the problem fed back by the user according to the determined usage log without communication with the user, thus improving speed and efficiency for solving the problem.

Figure 6:
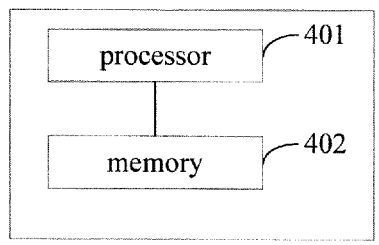
FIG. 6 is a block diagram illustrating a server according to another embodiment of the present disclosure.

FIG. 6 is a block diagram illustrating a server according to another embodiment of the present disclosure. Referring to FIG. 6, the server is configured to perform the method for determining a usage log provided in embodiments of the present disclosure. The server may include at least one processor 401 and a memory 402. The memory 402 may include a high speed RAM memory, and may also include a non-volatile memory, for example at least one disk memory. Alternatively, the memory 402 may include at least one storage device remote from the above mentioned processor 401.

In detail, the processor 401 is configured to call programs stored in the memory 402 to perform following operations:

filtering evaluation information with respect to a target software submitted by an application recommendation software of each of at least one mobile terminal, to obtain target evaluation information;

receiving usage logs with respect to the target software sent by at least one mobile terminal; and determining a usage log matching with the target evaluation information according to a preset matching rule.

In another embodiment, the target evaluation information may include a level lower than a preset level with respect to the target software and/or effective evaluation content.

In another embodiment, determining a usage log matching with the target evaluation information according to a preset matching rule includes: obtaining receiving time of the target evaluation information and receiving time of each usage log; and when an absolute value of a difference between the receiving time of the target evaluation information and receiving time of a usage log is less than or equal to a first preset threshold, determining that the usage log matches with the target evaluation information.

In another embodiment, determining a usage log matching with the target evaluation information according to a preset matching rule includes: obtaining receiving time of the target evaluation information, receiving time of each usage log, first parameter information of a mobile terminal sending the target evaluation information, and second parameter information of each mobile terminal sending each usage log, in which each of the first parameter information and the second parameter information includes a national language, a mobile phone type, and/or a software version number; and when an absolute value of a difference between the receiving time of the target evaluation information and receiving time of a usage log is less than or equal to a second preset threshold, and when the first parameter information of the mobile terminal sending the target evaluation information is same as second parameter information of the mobile terminal sending the usage log, determining that the usage log matches with the target evaluation information.

In another embodiment, when there is a plurality of usage logs determined to match with the target evaluation information, the processor is further configured to perform following operation: determining a final usage log matching with the target evaluation information according to evaluation content comprised in the target evaluation information.

With the embodiment of the present disclosure, the programmer can locate the problem fed back by the user according to the determined usage log without communication with the user, thus improving speed and efficiency for solving the problem.

It should be noted that relationship terms such as first and second are only used herein to distinguish an entity or operation from another entity or operation, and it is not necessarily required or implied that there are any actual relationship or order of this kind between those entities and operations. Moreover, terms such as "comprise", "comprising" and any other variants are intended to cover non-exclusive contains, so that the processes, methods, articles or devices including a series of elements not only include those elements but also include other elements that are not listed definitely, or also include the elements inherent in the processes, methods, articles or devices. In the case of no more restrictions, the elements defined by the statement 'comprise one . . . ' do not exclude that other same elements also exist in the processes, methods, articles or devices including the elements.

It should be noted that each embodiment in the specification is described in a relevant manner. For same or similar parts in the embodiments, reference may be made to each other. What is different from other embodiments is emphasized in each embodiment. In particular, for the apparatus embodiment, because it is basically similar to the method embodiment, the apparatus embodiment is described simply, and for a relevant part thereof, reference may be made to part of the description of the method embodiment.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases such as "in some embodiments," "in one embodiment", "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, it will be apparent to those skilled in the art that different embodiments or examples described in this specification, as well as features in different embodiments or examples, may be combined and combined without contradictory circumstances.

Those skilled in the art can combine different embodiments and the features in different embodiments described in this specification. The modules or units in all embodiments of the present disclosure may be implemented by a generally used integrated circuit, such as a CPU (central processing unit), or by ASIC (application specific integrated circuit).

The steps in the method of all embodiments of the present disclosure may be performed order adjusting, and be combined and deleted according to actual needs; modules or units in the device of all embodiments of the present disclosure may be combined, separated and deleted according to actual needs.

It will be understood that, the flow chart or any process or method described herein in other manners may represent a module, segment, or portion of code that comprises one or more executable instructions to implement the specified logic function(s) or that comprises one or more executable instructions of the steps of the progress. In addition, it should be understood by those skilled in the art to which the embodiments of the present disclosure belong that, the scope of preferred embodiments of the present disclosure includes other implementations in which the functions may be performed in an order other than order shown or discussed, including in a substantially simultaneous manner or in a reverse order with the functions involved, As will be understood by those skilled in the art to which this invention pertains.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It can be understood by those skilled in the art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The above-mentioned storage medium may be a read-only memory, a magnetic disk, an optical disks, etc. Although embodiments of the present disclosure have been shown and described, it would be appreciated by those skilled in the art that the above embodiments are explanatory and cannot be construed to limit the present disclosure, and changes, alternatives, and modifications can be made in the embodiments without departing from scope of the present disclosure.

What the above discloses is merely preferable embodiments of the present disclosure, and certainly cannot be construed to limit the scope of the present disclosure. All or part of flows of realizing above embodiments can be understood by those skilled in the art, and equivalent changes made according to the claims of the present disclosure is still within the scope of the present disclosure.

What is claimed is:

1. A method for determining a usage log, comprising:
    filtering evaluation information with respect to a target software submitted by an application recommendation software of each of at least one mobile terminal, to obtain target evaluation information;
    receiving usage logs with respect to the target software sent by at least one mobile terminal; and
    determining a usage log matching with the target evaluation information according to a preset matching rule.

2. The method according to claim 1, wherein the evaluation information comprises a level lower than a preset level with respect to the target software and/or effective evaluation content.

3. The method according to claim 1, wherein determining a usage log matching with the target evaluation information according to a preset matching rule comprises:
    obtaining receiving time of the target evaluation information and receiving time of each usage log; and
    when an absolute value of a difference between the receiving time of the target evaluation information and receiving time of a usage log is less than or equal to a first preset threshold, determining that the usage log matches with the target evaluation information.

4. The method according to claim 1, wherein determining a usage log matching with the target evaluation information according to a preset matching rule comprises:
    obtaining receiving time of the target evaluation information, receiving time of each usage log, first parameter information of a mobile terminal sending the target evaluation information, and second parameter information of each mobile terminal sending each usage log, wherein each of the first parameter information and the second parameter information comprises a national language, a mobile phone type, and/or a software version number; and
    when an absolute value of a difference between the receiving time of the target evaluation information and receiving time of a usage log is less than or equal to a second preset threshold, and when the first parameter information of the mobile terminal sending the target evaluation information is same as the second parameter information of the mobile terminal sending the usage log, determining that the usage log matches with the target evaluation information.

5. The method according to claim 1, wherein when there is a plurality of usage logs determined to match with the target evaluation information, the method further comprises:
determining a final usage log matching with the target evaluation information according to evaluation content comprised in the target evaluation information.

6. A device for determining a usage log, comprising:
a processor; and
a memory configured to store instructions executable by the processor,
wherein the processor is configured to read the executable instructions stored in the memory so as to:
filter evaluation information with respect to a target software submitted by an application recommendation software of each of at least one mobile terminal, to obtain target evaluation information;
receive usage logs with respect to the target software sent by at least one mobile terminal; and
determine a usage log matching with the target evaluation information according to a preset matching rule.

7. The device according to claim 6, wherein the evaluation information comprises a level lower than a preset level with respect to the target software and/or effective evaluation content.

8. The device according to claim 6, wherein the processor is further configured to:
obtain receiving time of the target evaluation information and receiving time of each usage log; and
when an absolute value of a difference between the receiving time of the target evaluation information and receiving time of a usage log is less than or equal to a first preset threshold, determine that the usage log matches with the target evaluation information.

9. The device according to claim 6, wherein the processor is further configured to:
obtain receiving time of the target evaluation information, receiving time of each usage log, first parameter information of a mobile terminal sending the target evaluation information, and second parameter information of each mobile terminal sending each usage log, wherein each of the first parameter information and the second parameter information comprises a national language, a mobile phone type, and/or a software version number; and
when an absolute value of a difference between the receiving time of the target evaluation information and receiving time of a usage log is less than or equal to a second preset threshold, and when the first parameter information of the mobile terminal sending the target evaluation information is same as the second parameter information of the mobile terminal sending the usage log, determine that the usage log matches with the target evaluation information.

10. The device according to claim 6, wherein the processor is further configured to:
determine a final usage log matching with the target evaluation information according to evaluation content comprised in the target evaluation information when there is a plurality of usage logs determined to match with the target evaluation information.

11. A non-transitory computer-readable storage medium having stored therein instructions that, when executed by a processor of a server, cause the server to perform a method for determining a usage log, the method comprising:
filtering evaluation information with respect to a target software submitted by an application recommendation software of each of at least one mobile terminal, to obtain target evaluation information;
receiving usage logs with respect to the target software sent by at least one mobile terminal; and
determining a usage log matching with the target evaluation information according to a preset matching rule.

12. The non-transitory computer-readable storage medium according to claim 11, wherein the evaluation information comprises a level lower than a preset level with respect to the target software and/or effective evaluation content.

13. The non-transitory computer-readable storage medium according to claim 11, wherein determining a usage log matching with the target evaluation information according to a preset matching rule comprises:
obtaining receiving time of the target evaluation information and receiving time of each usage log; and
when an absolute value of a difference between the receiving time of the target evaluation information and receiving time of a usage log is less than or equal to a first preset threshold, determining that the usage log matches with the target evaluation information.

14. The non-transitory computer-readable storage medium according to claim 11, wherein determining a usage log matching with the target evaluation information according to a preset matching rule comprises:
obtaining receiving time of the target evaluation information, receiving time of each usage log, first parameter information of a mobile terminal sending the target evaluation information, and second parameter information of each mobile terminal sending each usage log, wherein each of the first parameter information and the second parameter information comprises a national language, a mobile phone type, and/or a software version number; and
when an absolute value of a difference between the receiving time of the target evaluation information and receiving time of a usage log is less than or equal to a second preset threshold, and when the first parameter information of the mobile terminal sending the target evaluation information is same as the second parameter information of the mobile terminal sending the usage log, determining that the usage log matches with the target evaluation information.

15. The non-transitory computer-readable storage medium according to claim 11, wherein when there is a plurality of usage logs determined to match with the target evaluation information, the method further comprises:
determining a final usage log matching with the target evaluation information according to evaluation content comprised in the target evaluation information.

* * * * *